Figure 1:
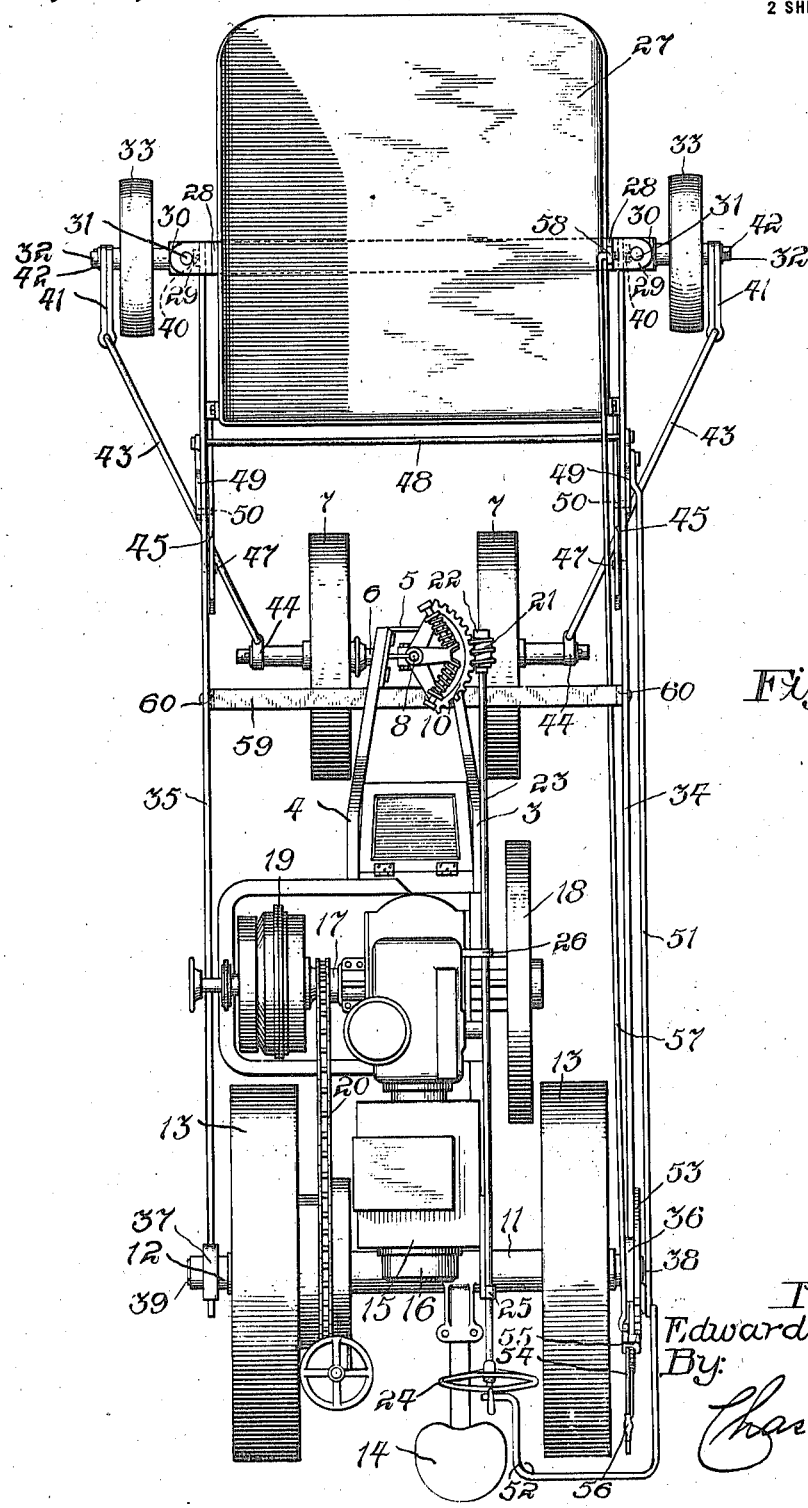

E. W. BURGESS.
WHEELED SCRAPER.
APPLICATION FILED JULY 17, 1916.

1,233,839.

Patented July 17, 1917.
2 SHEETS—SHEET 1.

Inventor.
Edward W. Burgess.
By:
Chas E. Lord
Atty.

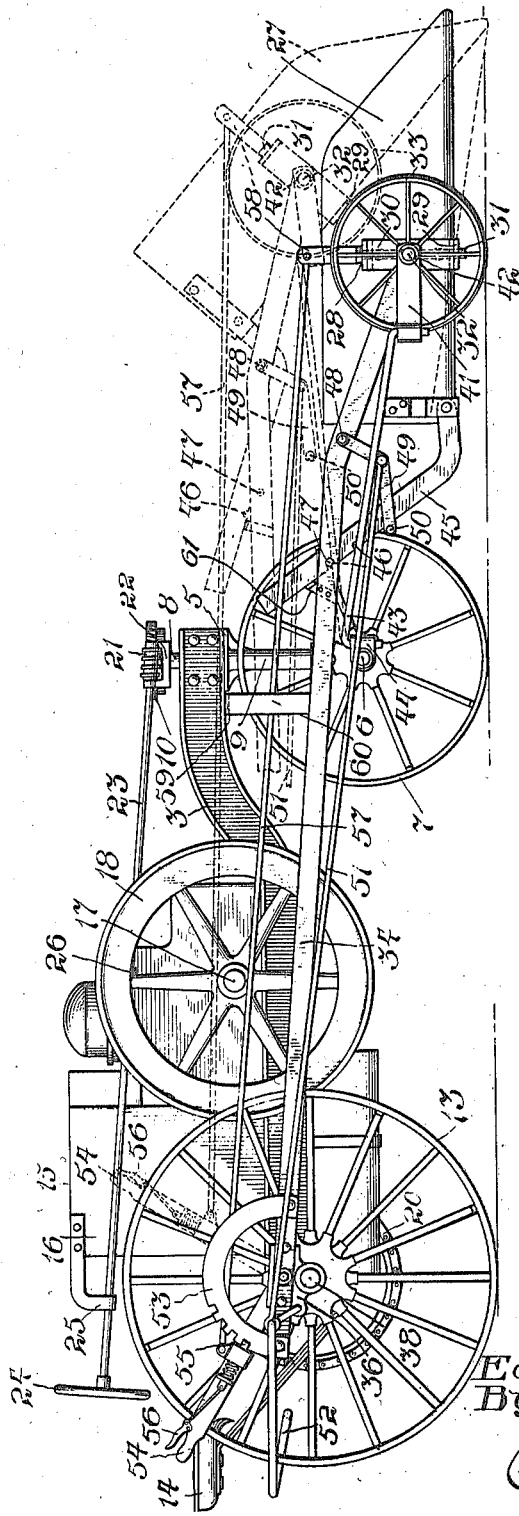

UNITED STATES PATENT OFFICE.

EDWARD W. BURGESS, OF CHICAGO, ILLINOIS, ASSIGNOR TO INTERNATIONAL HARVESTER COMPANY OF NEW JERSEY, A CORPORATION OF NEW JERSEY.

WHEELED SCRAPER.

1,233,839.  Specification of Letters Patent.  Patented July 17, 1917.

Application filed July 17, 1916. Serial No. 109,752.

*To all whom it may concern:*

Be it known that I, EDWARD W. BURGESS, a citizen of the United States, residing at Chicago, in the county of Cook and State of Illinois, have invented certain new and useful Improvements in Wheeled Scrapers, of which the following is a full, clear, and exact specification.

My invention relates to wheeled scrapers for excavating purposes; its object being to provide an implement of the class indicated adapted for tractor operation and controllable by an operator from the seat of the tractor.
This object is attained by means of the mechanism illustrated in the accompanying drawings, in which—

Figure 1 is a top plan view of a traction engine having a wheeled scraper operatively connected therewith and embodying my invention; and Fig. 2 is a side elevation of Fig. 1.

The same reference characters designate like parts throughout the several views.
The tractor includes right and left-hand truck frame members 3 and 4, respectively, 5 a bolster member secured to the front ends of said truck frame members, 6 a steering axle having steering wheels 7 journaled thereon, 8 a vertically disposed spindle connected with the axle and journaled in a depending tubular stem 9 secured to the bolster member 5, 10 a worm sector secured to the upper ends of the spindle, 11 a tubular truck frame member secured to the rear ends of the frame members 3 and 4 and having an axle 12 journaled therein, upon opposite ends of which are mounted traction wheels 13, 14 an operator's seat carried by the frame member 11, 15 an engine mounted upon the truck frame and including a power cylinder 16, an engine shaft 17, a fly wheel 18, a power transmission gearing 19 operatively connected with the axle 12 by means including a sprocket chain 20, 21 a worm journaled in bearings 22 and engaging with the worm sector 10, 23 a longitudinally disposed shaft having its front end operatively connected with the worm 21 and its rear end provided with a steering wheel 24, 25 a bracket member carried by the engine frame and having the rear end of shaft 23 journaled therein, and 26 a supplemental bracket having the middle of said shaft journaled therein.

The scraper includes a common form of receptacle 27 disposed in front of the tractor, 28 a reinforcing member extending across the bottom of the receptacle and secured thereto near its middle, and having its opposite ends turned upward and secured to its side walls, 29 U-shaped bracket members secured to the upturned ends of the member 28, 30 similar bracket members pivotally connected with the members 29 by means of vertically disposed hinge pins 31, 32 stub axle members secured to the bracket members 30 and having carrying wheels 33 journaled thereon.

The scraper is connected with the tractor by means including right and left-hand longitudinally disposed push bars 34 and 35, respectively, upon opposite sides of the tractor, having secured to their rear ends bearing sleeves 36 and 37, respectively, whereby they are journaled upon extensions 38 and 39, respectively, at opposite ends of the axle 12, 40 laterally extending studs secured to the bracket members 29 and having the front ends of the push bars 34 and 35 pivotally connected therewith, 41 rearwardly extending arms having their front ends journaled upon the extended free ends of the stub axles 32 and retained thereon by means of pins 42, 43 steering rods having their front ends pivotally connected with the rear ends of the arms 41 and their rear ends with thimbles 44 journaled upon the extended ends of the steering axle 6 of the tractor. 45 represents rearwardly and upwardly inclined latch bars having their lower front ends pivotally connected with the bottom of the scraper receptacle at its rear end and upon opposite sides thereof, and having spaced notches 46 in their lower edges near their rear ends that are adapted to engage with laterally extending studs 47 secured to the push bars 34 and 35, 48 a transversely disposed rock shaft having its opposite ends journaled in the push bars 34 and 35 and provided with rearwardly extending arms 49 secured thereto adjacent the push bars, having inwardly extending hooks 50 at their free ends engaging with the lower edges of the latch bars, and 51 a controlling rod having its front end pivotally connected with one of the arms 49 and its rear end with a foot lever 52 pivotally mounted upon the rear end of the push bar 34 convenient to the operator from the seat of the tractor, whereby the engagement of the latch bars 45 with the studs 47 may be controlled. 53 represents a toothed sector mounted upon the rear end of the push bar 34, 54 a pivoted hand lever having mounted thereon a spring-pressed sliding detent 55 adapted to engage the toothed sector and controlled by means of a thumb lever 56 in a common way, and 57 represents a rod operatively connecting the hand lever with the upwardly extended end 58 of one of the upturned ends of the member 28 secured to the body of the scraper, whereby the scraper may be tilted in varying operative planes. 59 represents a transversely disposed bar secured to the bolster member 5 and having depending arms 60 at its opposite ends adapted to slidably engage with the push bars 34 and 35 in a manner preventing a lateral swing of the scraper relative to the tractor when in operation and permitting a free rising and falling movement of the front ends of the push bars when the scraper is tilted toward a dumping position.

In operation the scraper during the loading operation is tilted upon its axis by means of the hand lever 54, the latch bars 45 being disengaged from the studs 47 by means of the foot lever 52. The latch bars will secure the receptacle in loading position independent of the hand lever. The scraper is pushed forward by the tractor, and when the receptacle is filled it is tilted rearward to a horizontal position, as shown by full lines in Fig. 2, and may then be moved in any direction, the steering connections between the scraper carrying wheels and the steering axle of the tractor controlling the path of travel of the scraper relative to that of the tractor. To dump the load the operator releases the latch bars by means of the foot lever, and by throwing the hand lever forward tilts the receptacle upon its axis until its front engages with the ground, when a continued advance of the tractor will cause the receptacle to be tilted forward and upward to a load dumping position, as shown by dotted lines in Fig. 2. The push bars 34 and 35 swing at their front ends as the load is being dumped, and the latch bars 45, actuated by gravity, ride upon the studs 47, and to prevent the notches therein from engaging with the studs there is provided stop members 61 secured to the push bars and adapted to retain the latch bars in a disengaged position until the scraper receptacle has been turned to a normal position with its carrying wheels upon the ground.

Having shown and described one form which my invention may assume in practice, I do not desire that it be confined to the specific details of construction as illustrated, it being understood that changes may be made in the form, proportion and organization of its several parts without departing from the spirit of my invention as indicated by the scope of the appended claims.

What I claim as my invention, and desire to secure by Letters Patent, is:

1. A scraper adapted for tractor operation including a tilting receptacle, and carrying wheels having said receptacle mounted thereon, a tractor, propelling means connecting said tractor with said scraper, tractor steering elements, said carrying wheels being turnable at varying angles relative to the line of travel and controlled by the steering elements of said tractor.

2. In combination, a tractor including a steering axle, a scraper adapted to be propelled in front of said tractor and including a receptacle, propelling elements connecting said tractor with said scraper, carrying wheels having said receptacle mounted thereon, said wheels being turnable at varying angles relative to the line of travel, and steering connections between said wheels and said tractor steering axle.

3. In combination, a tractor, a scraper including a receptacle adapted to be propelled in front of the tractor, combined carrying and steering wheels having said receptacle mounted thereon, push bars having their front ends pivotally connected with opposite sides of said scraper receptacle coaxially with said carrying and steering wheels and their opposite ends with opposite sides of the tractor, and means for tilting said receptacle at varying operative angles relative to said push bars.

4. In combination, a tractor including an axle having traction wheels mounted thereon, a steering axle, a scraper adapted to be propelled in front of said tractor and including a receptacle, steering wheels having said receptacle mounted thereon, the scraper propelling means including longitudinally disposed push bars upon opposite sides of said tractor, said push bars having their rear ends pivotally connected with opposite ends of said axle and their front ends pivotally connected with opposite sides of said scraper receptacle.

5. In combination, a tractor including an axle having traction wheels mounted thereon, a steering axle, a wheeled scraper adapted to be propelled in front of said tractor and including a receptacle, the scraper propelling means including longitudinally disposed push bars upon opposite sides of said tractor, said push bars having their rear ends pivotally connected with opposite ends of said axle and their front ends pivotally connected with opposite sides of said scraper receptacle, and means for tilting said receptacle at varying angles relative to said push bars, said means including a hand lever pivotally mounted upon the rear end of one of said push bars, a toothed sector coöperating with said hand lever, and a controlling rod connecting said hand lever with said receptacle.

6. In combination, a tractor, a wheeled scraper including a receptacle adapted to be propelled in front of said tractor, longitudinally disposed push bars upon opposite sides of said tractor having their rear ends pivotally connected therewith and their front ends pivotally connected with opposite sides of said scraper receptacle, means for tilting said receptacle at varying operative angles, and means for securing said receptacle in adjusted position, said means including rearwardly extending notched latch bars pivotally connected with said receptacle and adapted to releasably engage with said push bars.

7. In combination, a tractor, a wheeled scraper including a receptacle adapted to be propelled in front of said tractor, longitudinally disposed push bars upon opposite sides of said tractor having their rear ends pivotally connected therewith and their front ends pivotally connected with opposite sides of said scraper receptacle, means for tilting said receptacle at varying operative angles, means for securing said receptacle in adjusted position, said means including rearwardly extending notched latch bars pivotally connected with said receptacle and adapted to releasably engage with said push-bars, means for disengaging said latch bars, said means including a transversely disposed rock shaft having its opposite ends journaled in said push bars, crank arm secured to said shaft and engaging with said latch bars, and means for rocking said shaft.

8. In combination, a tractor including an axle having traction wheels mounted thereon, a wheeled scraper adapted to be propelled in front of said tractor and including a receptacle, the scraper propelling means including longitudinally disposed push bars upon opposite sides of said tractor, said push bars having their rear ends pivotally connected with opposite ends of said axle and their front ends pivotally connected with opposite sides of said scraper receptacle, means for tilting said receptacle at varying angles relative to said push bars, said means including a hand lever pivotally mounted upon one of said push bars and operatively connected with said receptacle, and means carried by said receptacle and releasably engaging said push bars in a manner to secure said receptacle in adjusted position.

9. In combination, a tractor, a wheeled scraper including a receptacle adapted to be propelled in front of said tractor, longitudinally disposed push bars upon opposite sides of said tractor having their rear ends pivotally connected therewith and their front ends pivotally connected with opposite sides of said scraper receptacle, means for tilting said receptacle at varying operative angles, and means for securing said receptacle in adjusted position, said means including rearwardly extending latch bars pivotally connected with said receptacle and adapted to releasably engage with said push bars, and manually controllable means carried by said push bars and operative to control an engagement of said latch bars with said push bars.

10. A wheel supported scraper including a tilting receptacle and steering elements, a tractor including steering elements, propelling means connecting said receptacle with said tractor, and operative connections between the steering elements of said tractor and the steering elements of said scraper whereby the line of travel of said scraper is controllable by said tractor steering elements.

11. In combination, a tractor including a truck frame, a wheeled scraper including a receptacle adapted to be propelled in front of said tractor, push bars connecting opposite sides of said receptacle with opposite sides of said tractor and adapted to rise and fall at their front ends, and a transverse bar carried by said truck frame and having said push bars slidably engaging therewith in a manner preventing a lateral swing thereof.

12. In combination, a tractor having steering means, and a scraper propelled by said tractor and having steering means connected to the tractor steering means.

13. In combination, a tractor having steering means, a scraper propelled by said tractor and having steering means, and a connection between the steering means of the tractor and scraper whereby one of the same is controlled by the other.

In testimony whereof I affix my signature.

EDWARD W. BURGESS.